United States Patent Office 3,475,149
Patented Oct. 28, 1969

3,475,149
GLASS FIBER LUBRICANT IN SIZING PROCESS
Nickolas C. Eckerle, Glen Ellyn, and William H. Thompson, Lisle, Ill., assignors to Nalco Chemical Company, Chicago, Ill., a corporation of Delaware
No Drawing. Filed May 19, 1966, Ser. No. 551,230
Int. Cl. C03c 25/02
U.S. Cl. 65—3                                    4 Claims

ABSTRACT OF THE DISCLOSURE

A process for manufacturing glass fibers by treating said fibers with a size comprising water, a binder, and lubricant is disclosed. The improvement comprises using as a lubricant a blend of an alkoxylated quaternary fatty amine and an epoxide compound.

---

This invention relates to a process wherein glass fibers are produced, and more particularly to a novel lubricant employed to improve the operational efficiency of the fiber production.

The application of chemical treating agents to glass fibers as they are being produced has long been accepted as a necessary practice which materially assists in producing acceptable commercial products. Glass fibers have found more and more practical uses as textiles, as technology has improved. The use of glass fibers in reinforcing plastics is another area in which substantial economic growth has been fostered by technical methods which improve the processing of the fibers.

Basically, the process of making glass fibers is simple. A source of glass, such as glass marbles, is melted and forced through a mechanical device which produces glass filaments. This device may be strictly mechanical, such as a bushing, or may include the use of physical forces such as blown or forced air. Once the melted glass has passed through the filament forming device, conventional technique is to then treat the filaments by application of a "size" which performs a variety of functions. The treated filaments are thereafter converted into fibers and processed into yarns, strands, fabrics, etc.

As mentioned above, substantial improvement in the use of glass fibers has come about because of improved technology in the application of various sizing agents which improve the physical characteristics of the glass fibers. Typical sizing agents comprise a wetting agent, a binder and a lubricant, with other materials such as coupling agents and the like being added for particular process purposes.

By far, the most conventional wetting agent is water. This wetting agent makes up the great majority of the sizing agent and serves to create and maintain strand integrity. The amount of wetting agent in a typical size will range from about 80% to 99% by weight, with a preferred range of this component being from about 85% to 97% by weight.

The second component of the size, the binder, is generally defined as a film-forming material, and should be water-soluble or water-emulsifiable. Along with these properties, it is necessary that the binder be non-sensitive to water after cure and capable of giving a reproducible material. Typical examples of binders which may be used in a size are saturated polyesters, polyvinyl pyrrolidones, epoxy resins, polyamides, polyacrylates, polyvinyl alcohols, gelatin, casein, starches, and the like. The amount of binder will range generally from about 1% to 20% of the size, with a preferred range being from about 3% to about 15% by weight.

It has been said that one of the prime factors contributing to the increased use of glass fibers in the discovery of improved lubricants which are employed as a third component in the size. Lubricants perform a variety of functions and have permitted process developments which would be otherwise unattainable. Lubricants eliminate or greatly reduce fiber breakage which is, of course, a serious problem with fragile glass materials. Also, fuzzy ends of strands are, for the most part, eliminated and cleaner drawing of the fibers is possible. Lubricants assist in improving wet out, and allow for good contact between the plastic and the glass in fiberglass reinforced plastic materials. When the fibers are cut into strands by passing a filament through a cutting device, the lubricant functions in a dual capacity, providing a smooth passage through the cutting device and insuring that a clean cut will be made.

In addition to performing these functions, lubricants must be capable of being burned off after the fibers have been formed. For example, in the Coronizing (Registered U.S. trademark of Owens-Corning Fiberglas Corporation) process, fiberglass textiles are heated to approximately 1100° to 1300° F. in an oxidizing atmosphere for size removal, to set the weave, and to release tension or stress in the glass fibers. It is essential that the lubricant have a low enough vaporization temperature to permit complete removal during this treatment. In addition, the lubricant functions to prevent migration of the size to the surface of glass fibers which are coiled on a cylinder and cured, thereby providing a more uniform product. The amount of lubricant which is included in the size is minor and, for that reason, must be a highly effective material if the desired results are to be achieved. Normal amounts of addition will range from about 0.05% to about 1%, based on the weight of the size. A preferred range of addition is from about 0.1% to 0.5% by weight. Most preferred, for the purposes of this invention, is to employ about 0.2% to 0.5%.

Heretofore, a number of lubricants have been proposed to satisfy the above set forth requirements. Among the lubricants presently in use, imidazolines, polyamides, amido imidazolines, amides and diamides of various long-chain fatty acids, and reaction products of fatty acids and polyalkylene polyamines are currently being employed. However, there is presently no single lubricant available to the fiberglass art which is capable of satisfactorily performing the varied functions of a lubricant.

Accordingly, it is an object of this invention to provide a lubricant useful in the process of manufacturing glass fibers.

Another object of this invention is to provide a lubricant which is effective in eliminating or reducing fiber breakage and providing clean draw and cut of the fibers during processing.

Still another object of this invention is to provide a lubricant which permits good contact between the glass fibers and plastics in fiberglass reinforced plastic products.

Yet another object of this invention is to provide a lubricant which is readily burned off after use, and which prevents migration of the size during processing of spools of glass fibers.

Other objects will become apparent to those skilled in the art upon a reading of the following detailed description of the invention.

In accordance with the invention, a new class of fiberglass size lubricants have been discovered. In their broadest aspect, these compounds are mixtures of (1) from 5% to 20% by weight of an epoxide compound having an epoxide equivalent of at least 70 and containing 1.0–9.0 epoxide groups per molecule and (2) from 80% to 95% by weight of an alkoxylated quaternary fatty amine.

The lubricants of this invention have been found to assist in the production of superior glass fibers in a process wherein glass is melted, formed into filaments, treated with a sizing agent and thereafter converted into fibers. In this process, the sizing agent comprises a wetting agent, a binder and the lubricant of this invention.

The alkoxylated quaternary fatty amines of this invention are defined as being fatty amines which have been reacted with at least 2 moles of an alkylene oxide and thereafter quaternized.

It is essential for the purpose of this invention that the fatty amine contain at least 8 carbon atoms and preferably at least 14 carbon atoms. The amine reactant may be cyclic or acyclic in nature. Representative amines include those shown in Table I below.

TABLE I (1) n-Dodecyl amine
(2) n-Tetradecyl amine
(3) n-Hexadecylamine
(4) Lauryl amine
(5) Myristyl amine
(6) Palmityl amine
(7) Stearyl amine
(8) Oleyl amine
(9) Coconut oil amine
(10) Tallow amine
(11) Hydrogenated tallow amine
(12) Cottonseed oil amine
(13) Dilauryl amine
(14) Dimyristyl amine
(15) Dipalmityl amine
(16) Distearyl amine
(17) Dicoconut amine
(18) Dihydrogenated tallow amine
(19) Soya amine (Hexadecyl—10%, Octadecyl—10%, Octadecenyl—35%, Octadecadienyl—45%)

The first step in the formation of the alkoxylated quaternary fatty amines of this invention is to alkoxylate or react the amine with an alkylene oxide. Preferred alkylene oxides are ethylene oxide, propylene oxide and butylene oxide. Normally, from 2 to 6 moles of alkylene oxide per mole of amine will be satisfactory for the purposes of this invention, with 2 moles of alkylene oxide per mole of amine being most preferred. This reaction is well-known in the art and may conventionally be carried out under normal reaction conditions.

Once the fatty amine has been reacted with the alkylene oxide, the final step in forming the alkoxylated quaternary fatty amines is to effect alkylation of the amines to form quaternary compounds. Examples of these alkylation agents which may be used in the process of this invention are dimethyl sulfate, methyl chloride, $C_2$–$C_{22}$ alkyl halides, such as ethyl chloride, propyl chloride, etc., alkaryl halides such as benzyl chloride, substituted benzyl chlorides, epihalohydrins such as epichlorohydrin, sulfones, oxiranes, lactones, such as beta-propiolactone, polyoxyalkylene halides and the like. Preparation of these quaternaries is conventional and the choice of the particular alkylating agent is left to the direction of the operator. A wide variety of these materials are available commercially.

The second component which comprises the lubricant of this invention has been defined as being an epoxide-containing compound having an epoxide equivalent of at least 70 and containing 1.0–9.0 epoxide groups per molecule. The more preferred epoxide-containing compounds have an epoxide equivalent of at least 175 and contain 1.0–9.0 epoxide groups per molecule. The most preferred epoxide reactants are epoxy resins which have a terminal epoxide group and an epoxide equivalent of at least 175 and contain 1.4–8.0 epoxide groups per molecule. Representative members of this group as well as other epoxy compounds which may be used in the invention are listed below in Table II.

TABLE II

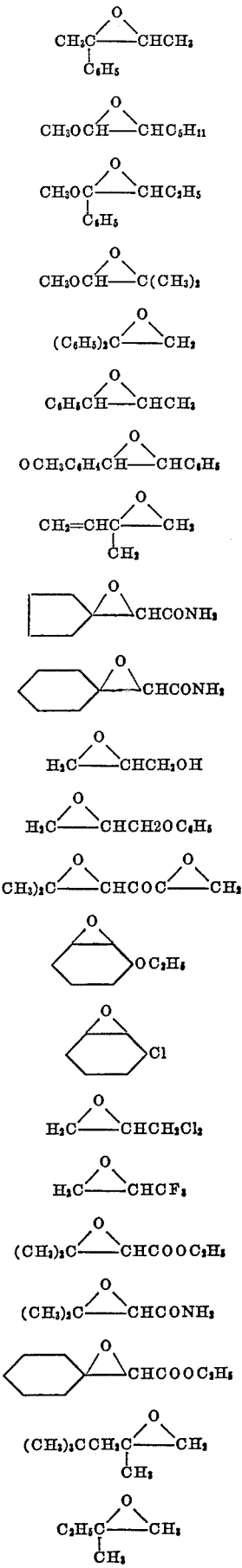

(23) 

(24) 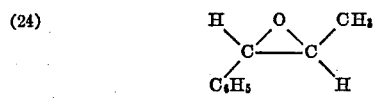

(25) 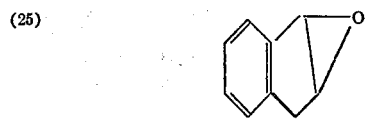

(36) 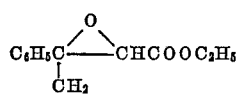

(37) 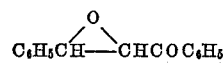

(38) "Epi-Rez" epoxy resin—Epoxy equivalent =190-200

(39) 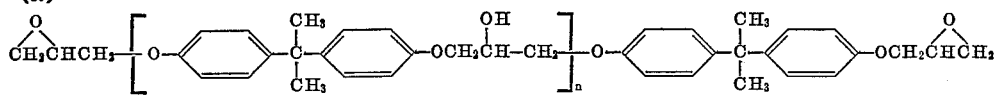

(26) 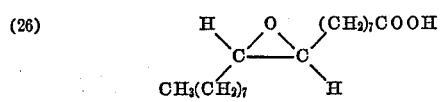

(40) "Epoxol" epoxy resin
(41) "Admex 711"—epoxidized soybean oil
(42) "Epon 828" epoxy resin
(43) 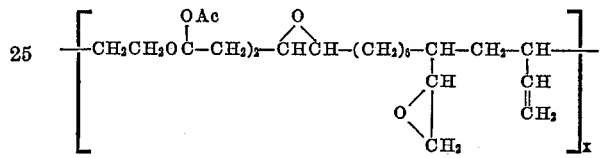

(27) 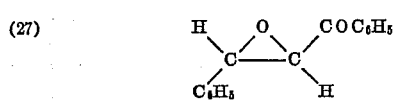

(28) 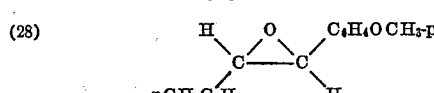

(Ac=acetal, average molecular weight=1500)

(44) Butadiene diepoxide
(45) Glycidol
(46) Butylene oxide
(47) Epoxidized fatty glyceride—Epoxy equivalent =190-200

(29) 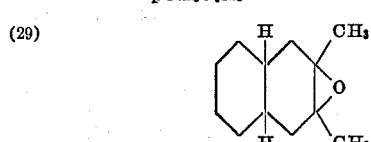

(48) 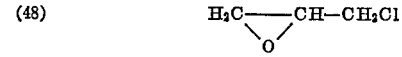

(49) Butadiene dimer diepoxide (3) 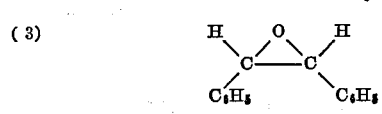

(50) 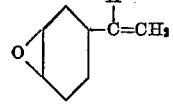

(31) 

(51) 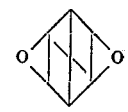

(32) 

(52) 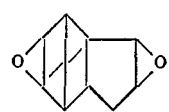

(33) 

Table III below lists a few of the alkoxylated quaternary fatty amines of the invention which may be formed according to the discussion above.

TABLE III

| Product No.: | Amine | Moles Alkylene Oxide | Alkylation Agent |
|---|---|---|---|
| 1 | Lauryl amine | 2 moles ethylene oxide | Methyl chloride. |
| 2 | Coconut oil amine | 2 moles propylene oxide | Ethyl chloride. |
| 3 | Coco amine | 2 moles ethylene oxide | Benzyl chloride. |
| 4 | Distearyl amine | 2 moles butylene oxide | Epichlorohydrin. |
| 5 | Octyl methyl amine | 4 moles ethylene oxide | Beta-propiolactone. |
| 6 | Hexyl ethyl amine | 6 moles ethylene oxide | Benzyl chloride. |
| 7 | Dihydrogenated tallow amine | 4 moles propylene oxide | Propyl chloride. |

(34) 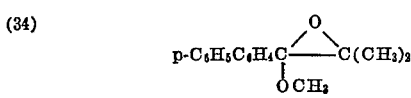

(35) 

The following examples are listed as illustrative of the types of lubricants useful in the process of this invention.

Example I

Percent by weight

Alkoxylated quaternary fatty amine 1 from Table III _____ 80
Epoxide compound 4 from Table II _____ 20

Example II

| | Percent by weight |
|---|---|
| Alkoxylated quaternary fatty amine 2 of Table III | 85 |
| Epoxide compound 13 from Table II. | |

Example III

| | Percent by weight |
|---|---|
| Alkoxylated quaternary fatty amine 3 of Table III | 90 |
| Epoxide compound 38 from Table II | 10 |

Example IV

| | Percent by weight |
|---|---|
| Alkoxylated quaternary fatty amine 4 of Table III | 95 |
| Epoxide compound 29 from Table II | 5 |

Example V

| | Percent by weight |
|---|---|
| Alkoxylated quaternary fatty amine 5 of Table III | 80 |
| Epoxide compound 40 from Table II | 20 |

Example VI

| | Percent by weight |
|---|---|
| Alkoxylated quaternary fatty amine 6 of Table III | 85 |
| Epoxide compound 50 of Table II | 15 |

Example VII

| | Percent by weight |
|---|---|
| Alkoxylated quaternary fatty amine 7 of Table III | 90 |
| Epoxide compound 39 of Table II | 10 |

As set out above, the above-described compounds are surprisingly effective as lubricants in the process of manufacturing glass fibers. The following are examples of size formulations embodying the features of this invention and which contain the lubricant of this invention.

Example VIII

| | Percent by weight |
|---|---|
| Starch binder | 2.0–12.0 |
| Lubricant described in Example II | 0.1–0.5 |
| Water | 87.5–97.9 |

Example IX

| | Percent by weight |
|---|---|
| Starch binder | 3.0–9.0 |
| Lubricant described in Example III | 0.2–0.5 |
| Water | 90.5–96.8 |

Example X

| | Percent by weight |
|---|---|
| Polyvinyl acetate binder | 2.0–12.0 |
| Lubricant of Example IV | 0.05–1.0 |
| Water | 87–98 |

Example XI

| | Percent by weight |
|---|---|
| Polyvinyl acetate binder | 1.5–8 |
| Lubricant of Example V | 0.05–1.0 |
| Water | 91.0–98.4 |

Example XII

| | Percent by weight |
|---|---|
| A binder (saturated polyester) | 3–15 |
| Lubricant of Example VI | 0.1–1.0 |
| Water | 84.0–96 |

It will be apparent from the foregoing that a number of new and improved lubricants useful in manufacturing glass fibers have been provided. These glass fibers may be used in strand end yarn formation and in the fabrication of fabrics thereof to be used as textile material or in combination with resinous materials in the manufacture of reinforced plastics, laminates, coated fabrics, cords, and the like composite structures.

What is claimed is:

1. In a process for manufacturing glass fibers, wherein glass is melted, formed into filaments, treated with a size comprising water, a binder and lubricant, and thereafter said filaments are converted into glass fibers, the improvement comprising: using as a lubricant a compound wherein 0.05–1.0% by weight of the lubricant is employed, based on the weight of the size and comprising from 80% to 95% by weight of a primary or secondary fatty amine which contains 8 to 36 carbon atoms in the fatty group, said amine having been reacted with 2 to 6 moles of an alkylene oxide to form an alkoxylated quaternary fatty amine, and from 5% to 20% by weight of an epoxide compound having an epoxide equivalent of at least 70 and containing from 1.0 to 9.0 epoxide groups per molecule.

2. The process according to claim 1 wherein the epoxide compound has an epoxide equivalent of at least 175 and which contains 1.4–8.0 epoxide groups per molecule.

3. The process according to claim 1 where the alkylene oxide is selected from the group consisting of ethylene oxide, 1,2-propylene oxide, and 1,2-butylene oxide.

4. The process according to claim 3 where the alkylene oxide is ethylene oxide.

References Cited

UNITED STATES PATENTS

| | | |
|---|---|---|
| 2,390,370 | 12/1945 | Hyde. |
| 2,679,504 | 5/1954 | Katzman 260—404 |
| 2,949,441 | 8/1960 | Newey. |
| 2,991,196 | 7/1961 | Biefeld. |
| 3,271,350 | 9/1966 | Vertnik. |

S. LEON BASHORE, Primary Examiner

R. L. LINDSAY, Assistant Examiner

U.S. Cl. X.R.

117—126; 260—18, 32.6

PO-1050
(5/69)

UNITED STATES PATENT OFFICE
CERTIFICATE OF CORRECTION

Patent No. 3,475,149            Dated October 28, 1969

Inventor(s) Nickolas C. Eckerle et al

It is certified that error appears in the above-identified patent and that said Letters Patent are hereby corrected as shown below:

> Column 4, formula 13, that portion of the formula reading "CHCOC" should read '''CHCOCH'''.
>
> Column 7, line 4, after "Table II.", and under "85", insert "            15"

SIGNED AND
SEALED
FEB 24 1970

(SEAL)
Attest:

Edward M. Fletcher, Jr.
Attesting Officer

WILLIAM E. SCHUYLER, JR.
Commissioner of Patents